No. 807,609. PATENTED DEC. 19, 1905.
C. ELLIS.
PROCESS FOR HYDRATING LIME.
APPLICATION FILED DEC. 26, 1903.
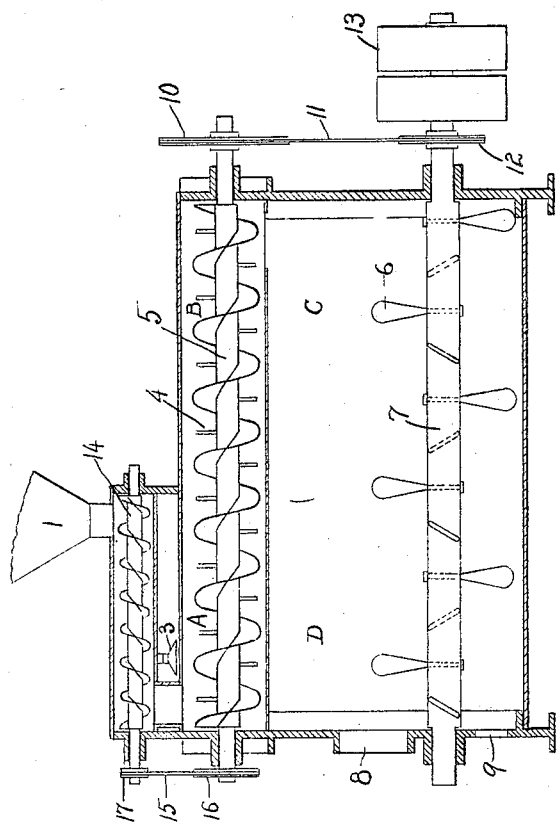
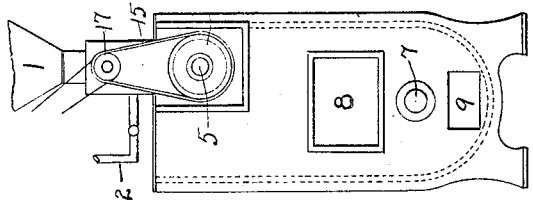

UNITED STATES PATENT OFFICE.

CARLETON ELLIS, OF BOSTON, MASSACHUSETTS.

PROCESS FOR HYDRATING LIME.

No. 807,609.  Specification of Letters Patent.  Patented Dec. 19, 1905.

Application filed December 26, 1903. Serial No. 186,671.

*To all whom it may concern:*

Be it known that I, CARLETON ELLIS, of Boston, in the county of Suffolk and State of Massachusetts, have invented certain new and useful Improvements in Processes for Hydrating Lime, of which the following is a specification.

Various processes are known by means of which dry hydrate of lime may be produced. All of these, however, have the disadvantage of being intermittent—that is to say, they depend upon bringing together in some way quicklime and water in a slaking-pan until the water has been chemically absorbed by the lime. Such processes require cumbersome machinery and constant attention. The charging and discharging of the slaker consumes much time.

The object of my invention is to provide a process for the continuous production of dry hydrate of lime by the slaking of quicklime with a suitable amount of water.

When water in suitable proportion is added to ground or crushed quicklime, the following phenomena occur: First, a thick paste is formed which more or less quickly dries by absorption of the water to a granular mass without expansion. This I call the "period of absorption." Second, the granular mass grows hot, evolving steam, and expands into a voluminous powdery mass of hydrated lime which is usually whiter than the original quicklime. This may be called the "period of reaction or hydration." The transition from the first to the second stage is accelerated and made more positive by the agency of external heat. In order to obviate the use of fuel in any form for generating the heat required, I find it preferable to make use of the heat of reaction of the slaking lime. My invention therefore provides for the utilization of the waste heat generated during the hydration period to accelerate the water absorption occuring in the first period and to thus shorten the period of hydration and make it of positive duration. My process accomplishes this as follows: The quicklime and the water are placed in two adjacent receptacles and are discharged from these in continuous streams. The stream of water should be as a general rule not more than one-half the mass of the quicklime stream. The stream of water is caused to unite with the stream of quicklime, and the united stream thereby produced is passed along a channel which is externally heated, and the stream has its continuity destroyed by means of baffle-irons or agitators placed in its path. Water absorption sets in as the mass progresses, the fragments of quicklime show signs of disintegration, and the water disappears. As soon as the water absorption or first stage is finished the material is discharged into a chamber, where it is rapidly beaten as the pulverulent hydrated lime forms. After moving for a suitable distance (depending upon the nature of the lime) in this manner the lime will be completely slaked to a dry pulverulent powder and may be discharged into bins.

The amount of water with which a quicklime will combine to form a dry hydrated lime depends upon the impurities it carries. The reaction between pure oxid of lime and water is expressed as follows:

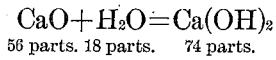
$$CaO + H_2O = Ca(OH)_2$$
56 parts. 18 parts.  74 parts.

or fifty-six pounds of pure oxid of lime will unite with eighteen pounds of water to form seventy-four pounds of calcium hydrate. The stoichiometrical ratio of quicklime to water is therefore 56:18. Since quicklime always contains impurities of lime-stone, silica, iron, alumina, &c., in practice water will not be absorbed in this ratio, but in lesser amount. In the case of magnesian quicklime the amount of water taken up chemically is very much less, as oxid of magnesia does not readily form a hydrate under the same conditions. In practice I have found considerable water to be lost as steam during the slaking. The temperature of the slaking mass reaches 212° Fahrenheit, and some water is vaporized before it can be absorbed by the lime. It is necessary to allow for this loss, and therefore to exceed the stoichiometrical ratio of 56:18 whenever a completely-hydrated product is desired. If the product is to be incompletely hydrated, a lesser amount of water may be used. A ratio of 56:25 is more suitable for quicklime high in oxid of lime. This means that if in a given interval the stream from the lime-bin discharges fifty-six pounds of quicklime during that same interval twenty-five pounds of water must mingle uniformly with the lime stream.

The lime used is preferably crushed or cracked lime. The more finely divided it is the quicker the reaction of hydration sets in. The water used may be warmed before mingling with the lime. Water at a uniform temperature is desirable.

For carrying out my process the apparatus shown in the accompanying drawings may be employed.

In the drawings, Figure 1 is a longitudinal section, and Fig. 2 an end elevation.

This machine is in the shape of an oblong box with a curved bottom, which rests on four legs. The interior of the box is divided into two compartments, an upper or water-absorption chamber A B and a lower or hydration chamber C D. The opening 1 is for the entrance of lime. 2 is a water-pipe fitted with a gage and at the end with a sprayer 3. The lime and water run into the upper compartments, through which runs a screw conveyer on a shaft 5, which is also fitted with mixing-paddles 4. The bottom of the compartment fits around this conveyer, thus forming a circular trough for the lime and water. As the conveyer turns it thoroughly mixes the lime and water and at the same time gradually moves the mixture forward to the opposite end, there to drop to the lower compartment. Through the lower compartment runs a shaft 7, which is fitted with mixing-paddles 6. These paddles are set at an angle, so that they gradually move the lime along toward the opposite end, and it then passes out through the discharge-opening 8.

9 is an opening to enable one to clean out the mill.

The driving power is applied to lower shaft at 13 by means of a pulley.

10 is a sprocket-wheel on the upper shaft, and 12 a sprocket-wheel on the lower shaft. These sprockets are connected by a chain, thus transmitting power to turn upper shaft.

A small conveyer 14, attached to lime-bin 1 and actuated, through chain and sprockets 15, 16, and 17, by shaft 5, serves to feed the lime in a uniform manner from the lime-bin to the mixing-conveyer.

The screw type is not the only form of conveyer which may be utilized. Any other form of conveyer could be used; but the screw conveyer equipped with mixing-paddles is the most satisfactory and efficient.

To operate this apparatus, fill the lime-bin with pulverized lime and start the machinery in motion. Open the throttle at the bottom of the lime-bin, admitting a stream of lime into the upper chamber. Open the water-valve until water is running in at the correct rate. The speed of the conveyer should be such that the absorption of water is practically complete before the material has reached the discharging end of the upper chamber. In this way contact of the wet lime with the pulverulent hydrated lime in the lower chamber and the formation of a lumpy product are avoided. These conditions having been adjusted, the machine may be allowed to run without further attention and will produce a perfectly uniform product of completely-hydrated lime in an automatic and continuous manner.

My process for the continuous slaking of lime produces a uniform product with simpler apparatus than that used in other processes. Intermittent processes do not give a wholly uniform product. The saving in labor by my process owing to its automatic action is also very great as compared with the present intermittent processes.

From the foregoing it will be evident that my invention comprises the process of partially or completely hydrating lime in a continuous manner under the influence of the accelerating action of the heat generated during the operation.

I do not lay claim generically in the present invention to the methods of continuously hydrating lime described and claimed in Patents Nos. 800,635 and 802,354, granted to me on October 3, 1905, and October 17, 1905, respectively.

What I claim as my invention, and desire to secure by Letters Patent, is—

1. Process for the continuous production of dry, pulverulent hydrate of lime which consists in continuously mingling a stream of quicklime with a stream of water in suitable proportions and in subjecting the resulting stream of lime putty to continuous agitation and to the reaction-accelerating action of heat from a progressively-advancing, adjacent, heat-imparting mass of lime in an advanced stage of hydration, until the absorption of water has largely taken place, then causing the progressing stream in turn to become the heat-imparting agent and simultaneously rapidly agitating the same until converted into dry hydrate of lime.

2. Process for the continuous production of dry, pulverulent hydrate of lime which consists in continuously mingling a stream of quicklime with a stream of water in suitable proportions and in subjecting the resulting stream of lime putty to continuous agitation and to the reaction-accelerating action of indirectly-applied heat from a progressively-advancing, adjacent, heat-imparting mass of lime in an advanced stage of hydration until water absorption is substantially completed and the expansion due to incipient hydration has begun, then causing the progressing stream in turn to become the heat-imparting agent and simultaneously rapidly agitating the same until converted into dry hydrate of lime.

In testimony whereof I have affixed my signature in presence of two witnesses.

CARLETON ELLIS.

Witnesses:
ROBERT T. HAY,
SOPHIA WILSON.